(12) United States Patent
Olsen et al.

(10) Patent No.: US 12,197,880 B2
(45) Date of Patent: Jan. 14, 2025

(54) SYSTEMS AND METHODS FOR TRANSLATING TRANSACTION DESCRIPTIONS

(71) Applicant: Capital One Services, LLC, McLean, VA (US)

(72) Inventors: Sarah Olsen, Springfield, VA (US); Aditya Pai, San Francisco, CA (US); Brice Elder, Mishawaka, IN (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 301 days.

(21) Appl. No.: 17/126,672

(22) Filed: Dec. 18, 2020

(65) Prior Publication Data

US 2022/0198155 A1    Jun. 23, 2022

(51) Int. Cl.
*G06F 40/58* (2020.01)
*G06F 40/47* (2020.01)
*G06N 3/04* (2023.01)

(52) U.S. Cl.
CPC .............. *G06F 40/58* (2020.01); *G06F 40/47* (2020.01); *G06N 3/04* (2013.01)

(58) Field of Classification Search
CPC .......... G06F 17/00; G06F 40/00; G06F 40/20; G06F 40/263; G06F 40/279; G06F 40/289; G06F 40/295; G06F 40/40; G06F 40/42; G06F 40/47; G06F 40/58; G06N 3/00;

(Continued)

(56) References Cited

U.S. PATENT DOCUMENTS 8,065,291 B2 * 11/2011 Knorr ................... G06Q 30/02
                                                                707/706
10,572,607 B1    2/2020 Lesner et al.
(Continued)

OTHER PUBLICATIONS

Sharma, A. et al., "A French to English Language Translator Using Recurrent Neural Network with Attention Mechanism," (Abstract) Nanoelectronics, Circuits and Communication Systems (pp. 437-451) (Apr. 2020).

*Primary Examiner* — Hai Phan
*Assistant Examiner* — Alexander Joongie Kim
(74) *Attorney, Agent, or Firm* — TROUTMAN PEPPER HAMILTON SANDERS LLP; Christopher J. Forstner; John A. Morrissett

(57) ABSTRACT

Disclosed embodiments may include a method that includes receiving description data in an originating language for a user and a location associated with the user, identifying one or more names from the description data, retrieving additional data in the originating language based on the one or more names, generating enhanced description data in the originating language for the user based on the description data and the additional data, identifying a target language based on the location associated with the user, selecting a first trained neural network from a plurality of trained neural networks based the target language, providing the enhanced description data in the originating language to the first trained neural network, translating, via the first trained neural network, the enhanced description data from the originating language to the target language, and generating a graphical user interface for display that comprises the enhanced description data in the target language.

19 Claims, 5 Drawing Sheets

(58) Field of Classification Search
CPC ............ G06N 3/02; G06N 3/04; G06Q 30/02;
G06Q 30/06; G06Q 40/02
See application file for complete search history.

(56) References Cited

U.S. PATENT DOCUMENTS

| | | | |
|---|---|---|---|
| 2004/0078191 A1* | 4/2004 | Tian | G06F 40/263 704/9 |
| 2008/0015944 A1* | 1/2008 | Nose | G06Q 30/0601 705/26.1 |
| 2008/0243472 A1* | 10/2008 | DeGroot | G06F 40/58 704/2 |
| 2008/0300880 A1* | 12/2008 | Gelbman | G10L 15/26 704/E15.041 |
| 2009/0089172 A1* | 4/2009 | Quinlan | G06Q 30/06 705/17 |
| 2018/0165275 A1* | 6/2018 | Kochura | G06F 40/58 |
| 2019/0180258 A1* | 6/2019 | Amar | H04L 51/02 |
| 2019/0220922 A1* | 7/2019 | Barkas | G06Q 40/12 |
| 2019/0392820 A1* | 12/2019 | Chae | G10L 15/30 |
| 2020/0293165 A1* | 9/2020 | Gray | G06F 40/56 |
| 2021/0055942 A1* | 2/2021 | Guda | G06F 3/04842 |
| 2022/0138437 A1* | 5/2022 | Bullock | G06F 40/47 704/2 |

* cited by examiner

SYSTEMS AND METHODS FOR TRANSLATING TRANSACTION DESCRIPTIONS

FIELD

The disclosed technology relates to systems and methods for translating transaction descriptions of the user.

BACKGROUND

Credit card users typically view descriptions of their transactions online or via a mobile application to confirm purchases, review their transactions for fraud, review for accidental double purchases, and to compile data for budgets. These transaction descriptions may be in English or another language and show up in the list of transactions with purchase amount. Typically, the transaction descriptions are in a language that corresponds to a primary language of a country where the credit card was used. For example, credit card transactions descriptions for credit card transactions conducted in the United States are typically in English. While credit card transaction descriptions for credit card transaction conducted in Germany (e.g., due to international travel) are typically in German. A user that has Spanish or French as their primary language may have difficulty in reading transaction descriptions in English or German and deciphering whether the user is responsible for the associated purchases.

Accordingly, there is a need for generating dynamic translations of transaction descriptions or translations of transaction descriptions for account statements. Embodiments of the present disclosure are directed to this and other considerations.

SUMMARY

Disclosed embodiments may include a system that includes one or more processors and a memory in communication with the one or more processors and storing instructions are configured to cause the communication system to perform a method. The method may include receiving description data in an originating language for a user and a location associated with the user. The method may include identifying one or more names from the description data. The method may include retrieving additional data in the originating language based on the one or more names. The method may include generating enhanced description data in the originating language for the user based on the description data and the additional data. The method may include identifying a target language based on the location associated with the user. The method may include selecting a first trained neural network from a plurality of trained neural networks based the target language. The method may include providing the enhanced description data in the originating language to the first trained neural network. The method may include translating, via the first trained neural network, the enhanced description data from the originating language to the target language. The method may include generating a graphical user interface (GUI) for display that comprises the enhanced description data in the target language.

Disclosed embodiments may include a system that includes one or more processors and a memory in communication with the one or more processors and storing instructions are configured to cause the communication system to perform a method. The method may include receiving description data in an originating language for a user and a location associated with the user. The method may include identifying one or more names from the description data. The method may include retrieving additional data in the originating language based on the one or more names. The method may include generating enhanced description data in the originating language for the user based on the description data and the additional data. The method may include providing the enhanced description data in the originating language to a first trained neural network. The method may include translating, via the first trained neural network, the enhanced description data from the originating language to the target language. The method may include generating a graphical user interface (GUI) for display that comprises the enhanced description data in the target language.

Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1:
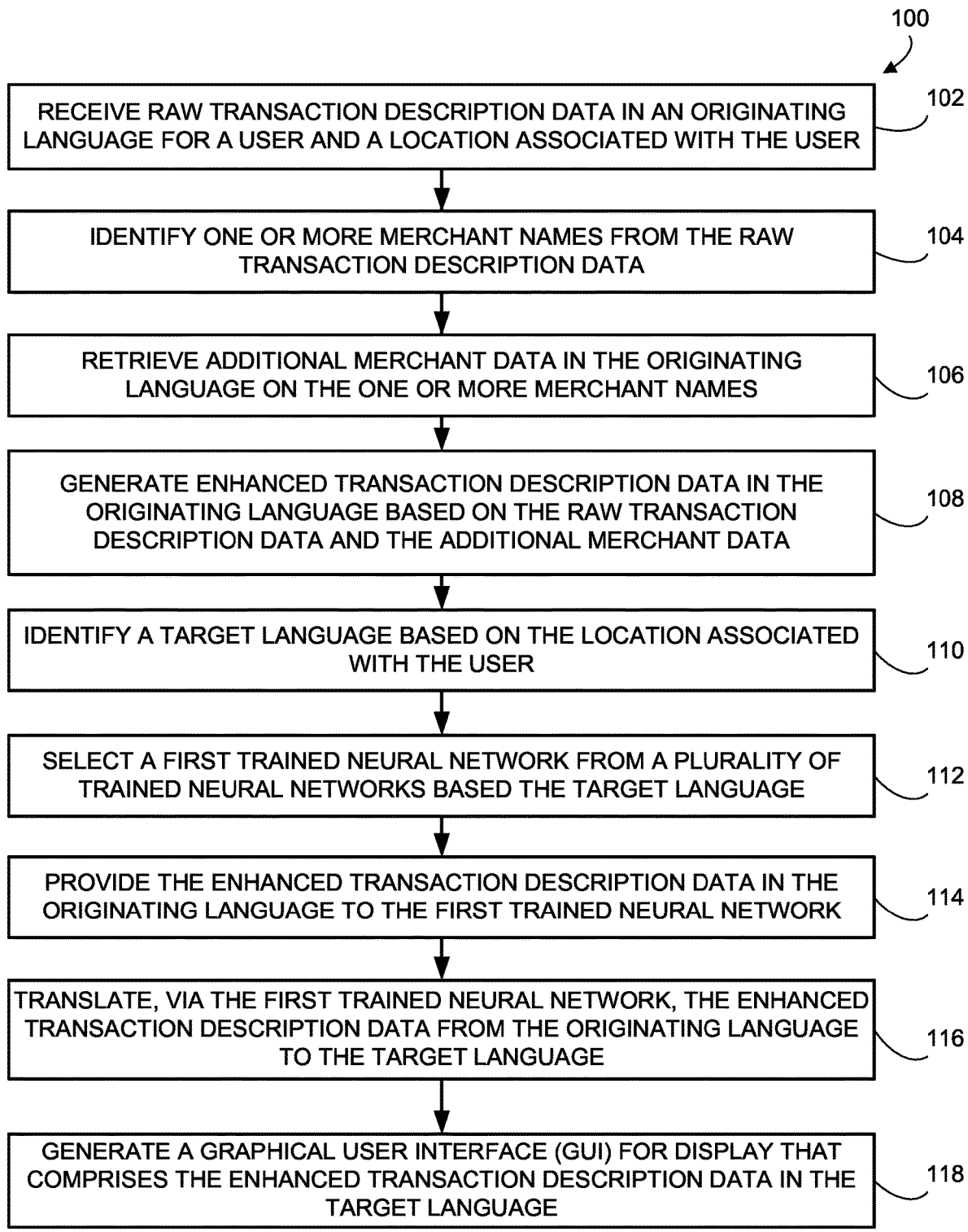
FIG. 1 is a flow diagram 100 illustrating examples of methods for translating enhanced transaction description data from an originating language to a target language, in accordance with certain embodiments of the disclosed technology.

FIG. 1 is a flow diagram illustrating examples of method 100 for translating enhanced transaction description data from an originating language to a target language, in accordance with certain embodiments of the disclosed technology. The steps of method 100 may be performed by one or more components of a transaction process system 508 (e.g., a transaction translation system 420 or a web server 510), as described in more detail with respect to FIGS. 4 and 5.

In block 102, the transaction process system 508 (e.g., transaction translation system 420) may receive raw transaction description data in an originating in an originating language for a user and a location (e.g., a billing location) associated with the user. The raw transaction description data may be received from a payment processing server (e.g., a TSYS server). In some embodiments, the location (e.g., billing location) associated with the user may be retrieved or received from the a card issuer.

In block 104, the transaction process system 508 (e.g., transaction translation system 420) may identify one or more merchant names from the raw transaction description data.

In block 106, the transaction process system 508 (e.g., transaction translation system 420) may retrieve or receive additional merchant data in the originating language based on the one or more merchant names from a third party server or a network server. The additional merchant data may be received from an application programming interface (API) response. The additional merchant data may include a specific merchant location (e.g., address) where a purchase was made, corporate address, phone number, email, website, brief description about the merchant, a rating of the merchant (e.g., a rating from the Better Business Bureau), or combinations thereof.

In some embodiments, the transaction process system 508 (e.g., transaction translation system 420) identifies the originating language associated with a transaction description for a given transaction. While the transaction process system 508 (e.g., transaction translation system 420) may identify the originating language by associating the specific location where a purchase was made from the additional merchant data. For example, if a transaction was made with a merchant located in the United States, the transaction process system 508 (e.g., transaction translation system 420) may identify the originating language as English. However, if a transaction was made with a merchant located in China, the transaction process system 508 (e.g., transaction translation system 420) may identify the originating language as China's official language, Mandarin. Alternatively, the originating language is detected based on the text of the raw transaction description data using natural language processing techniques (e.g., using n-grams, an RNN).

In block 108, the transaction process system 508 (e.g., transaction translation system 420) may generate enhanced transaction description data in the originating language based on the raw transaction description data and the additional merchant data. The enhanced transaction description data may be created by appending, combining, or supplementing the raw transaction description data with the additional merchant data received from the API response.

In block 110, the transaction process system 508 (e.g., transaction translation system 420) may identify a target language based on the location associated with the user. For example, if the user has a billing location in Montreal, Quebec, Canada, the transaction process system 508 may identify French as the target language. In contrast, if the user has a billing location near the U.S.-Mexico border (e.g., in San Diego, California or El Pas, Texas) the transaction process system 508 may identify Spanish as the target language. In some embodiments, the transaction process system 508 (e.g., transaction translation system 420) may prompt the user to select their language of choice during an account initiation or at some other time. For example, the user may select which language they would like their transactions to be translated to rather than relying on their physical billing location to determine a target language. In some embodiments, the transaction process system 508 (e.g., transaction translation system 420) may default to identifying the target language based on the location associated with the user, which can be overridden by the user who may select a target translation in their account preferences.

In block 112, the transaction process system 508 (e.g., transaction translation system 420) may select a first trained neural network from a plurality of trained neural networks based on the target language. For example, if the originating language is English and the target language is Spanish, the transaction process system 508 (e.g., transaction translation system 420) may select a trained neural network (e.g., one or more recurrent neural networks (RNNs) that is trained with a corpus of documents for translating enhanced or raw transaction descriptions from English to Spanish.)

In block 114, the transaction process system 508 (e.g., transaction translation system 420) may provide the enhanced transaction description data in the originating language to the first trained neural network.

In block 116, the transaction process system 508 (e.g., transaction translation system 420) may translate, via the first trained neural network, the enhanced transaction description data from the originating language to the target language.

In block 118, the transaction process system 508 (e.g., transaction translation system 420) may generate a graphical user interface (GUI) for display that includes the enhanced transaction description data in the target language or both the originating language and the target language. For example, if the transaction process system 508 (e.g., transaction translation system 420) determines that the enhanced transaction description data for a transaction is already in the target language, the interface will display the enhanced transaction description data in the originating language. If the transaction process system 508 (e.g., transaction translation system 420) translates the enhanced transaction description data for a transaction to the target language, the transaction process system 508 (e.g., transaction translation system 420) will generate and present a flag to a customer in the GUI indicating that the description associated with a transaction was translated along with the language of origin (e.g., Mandarin) and the target language (English). The transaction process system 508 (e.g., transaction translation system 420) will also provide the raw transaction details to the customer through the GUI (e.g., if the user clicks a button labeled "raw transaction data" or something similar). The GUI may also include a cleansed version of the merchant's name, address, phone number, website, category, brand logo, and a geolocation (map) to customers for each transaction.

In some embodiments, the transaction process system 508 (e.g., transaction translation system 420) may publish the GUI for a user device to retrieve (with or without an application programming interface (API)) or transmit the GUI to a user device. Regardless, the user may access the GUI via an application (e.g., mobile application) or via a website. Once the user accesses the GUI, she may personally evaluate whether the enhanced transaction description data in the targeted language is accurate. If the user decides that the translation is not accurate, the user can click a button or link indicating that the associated translation of a description of a particular transaction is not accurate thereby providing feedback to the system to update the training of the first trained neural network. In some cases, the user may be prompted to enter a corrected version of the associated enhanced transaction description data.

Similarly, the transaction process system 508 (e.g., transaction translation system 420) may complete the above process for every transaction for a given user in a given period (one a month) to generate a financial statement (e.g., credit card statement) that includes transaction descriptions of each transaction in the target language or in both the target language and the originating language.

Figure 2:
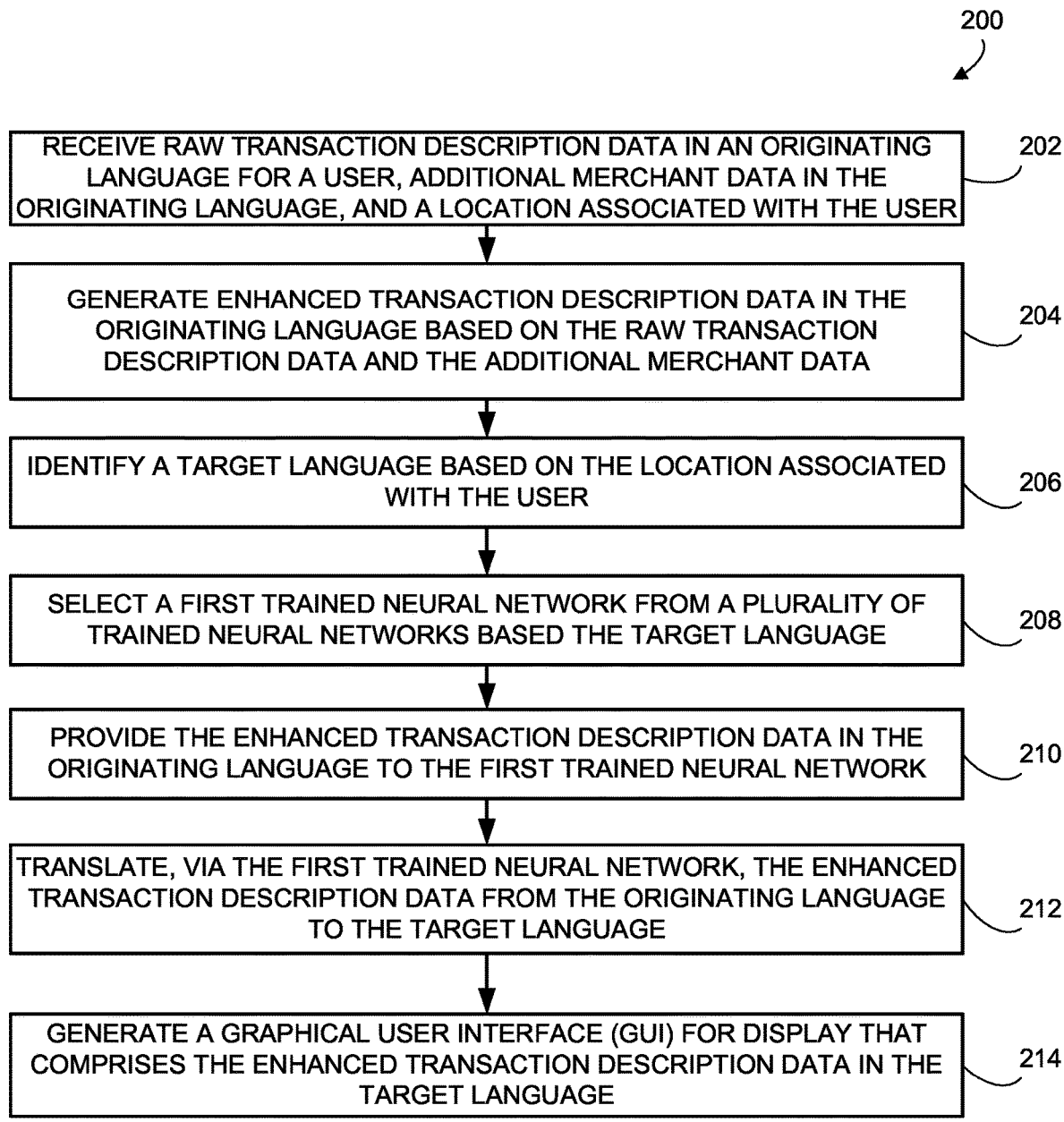
FIG. 2 is a flow diagram 200 illustrating examples of translating enhanced transaction description data from an originating language to a target language, in accordance with certain embodiments of the disclosed technology.

FIG. 2 is a flow diagram illustrating examples of method 200 for translating enhanced transaction description data from an originating language to a target language, in accordance with certain embodiments of the disclosed technology. The steps of method 200 may be performed by one or more components of a transaction process system 508 (e.g., a transaction translation system 420 or a web server 510), as described in more detail with respect to FIGS. 4 and 5.

Method 200 of FIG. 2 is similar to method 100 of FIG. 1, except that method 200 does not include blocks similar to blocks 104 and 106 of method 100 and the method 200 includes block 202 involves receiving additional merchant data in addition to receiving the location and the raw transaction description data rather than simply receiving the raw transaction description data as in block 102 in method 100. The descriptions of blocks 204, 206, 208, 210, 212, and 214 in method 200 are the same as or similar to the respective descriptions of blocks 108, 110, 112, 114, 116, and 118 of method 100 and are not repeated herein for brevity.

In block 202, the transaction process system 508 (e.g., transaction translation system 420) may receive raw transaction description data in an originating language for a user, additional merchant data in the originating language, and a location associated with the user.

Figure 3:
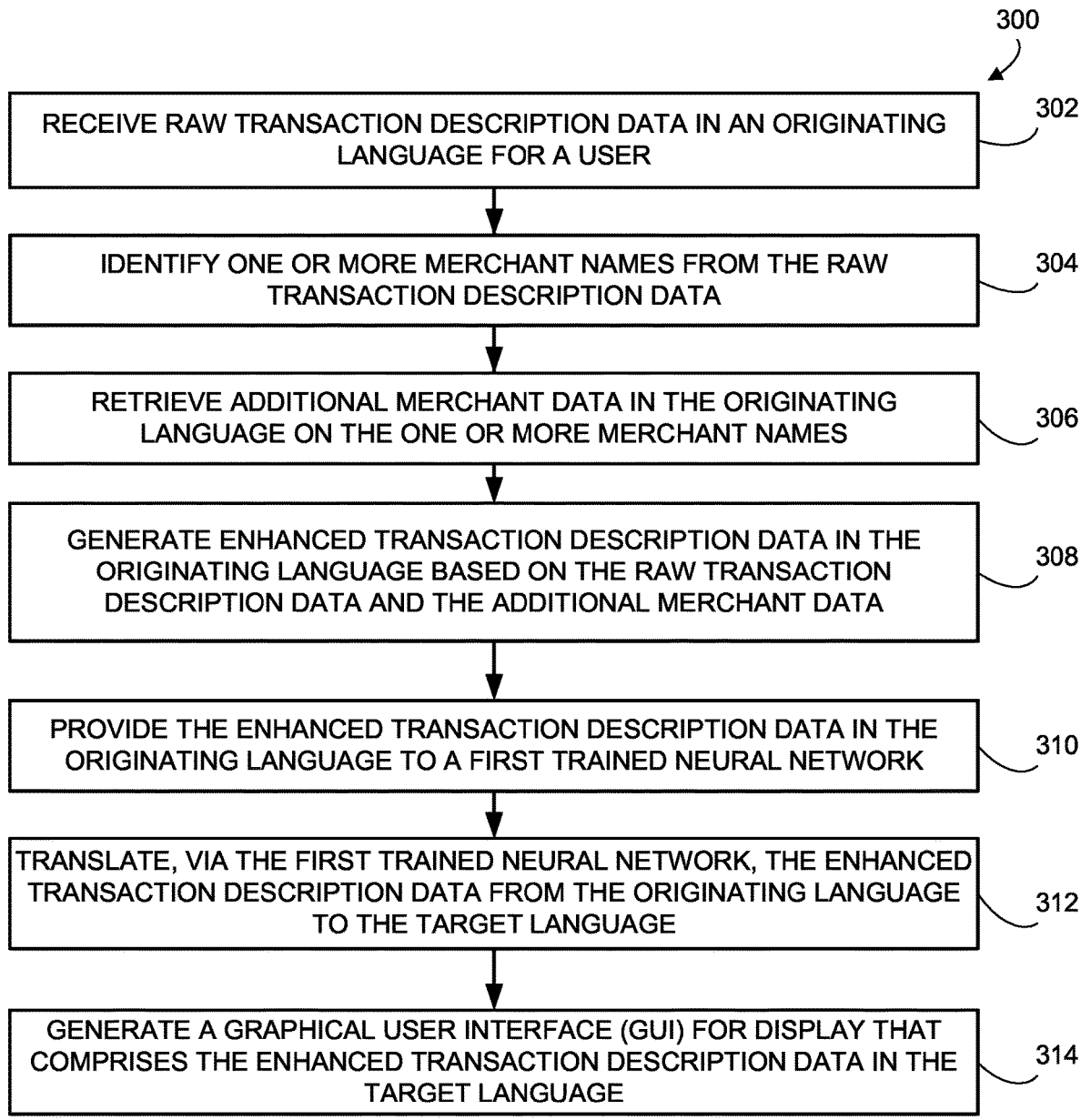
FIG. 3 is a flow diagram 300 illustrating examples of translating enhanced transaction description data from an originating language to a target language, in accordance with certain embodiments of the disclosed technology.

FIG. 3 is a flow diagram illustrating examples of method 300 for translating enhanced transaction description data from an originating language to a target language, in accordance with certain embodiments of the disclosed technology. The steps of method 300 may be performed by one or more components of a transaction process system 508 (e.g., a transaction translation system 420 or a web server 510), as described in more detail with respect to FIGS. 4 and 5.

Method 300 of FIG. 3 is similar to method 100 of FIG. 1, except that method 300 does not include blocks similar to blocks 110 and 112 of method 100. The descriptions of blocks 302, 304, 306, 308, 310, 312, and 314 in method 300 are the same as or similar to the respective descriptions of blocks 102, 104, 106, 108, 114, 116, and 118 of method 100 and are not repeated herein for brevity. Instead, method 300 does not identify a target language (one may be preselected for a user) and does not select a first trained neural network (one may be predetermined or pre-selected).

Figure 4:
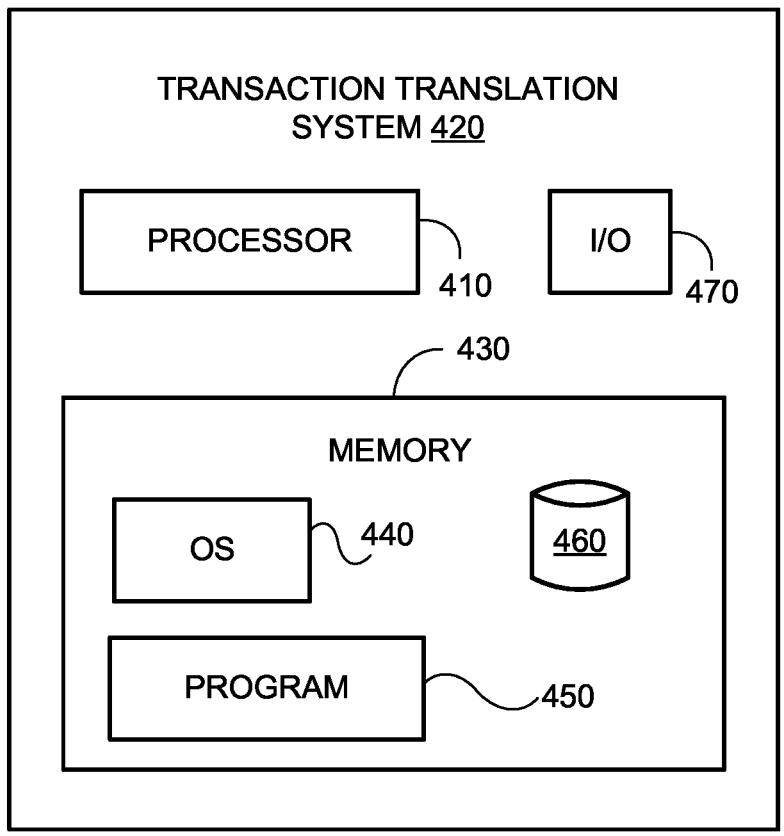
FIG. 4 is a block diagram of a transaction translation system 420 used to translate enhanced transaction description data from an originating language to a target language, according to an example implementation of the disclosed technology.
Figure 5:
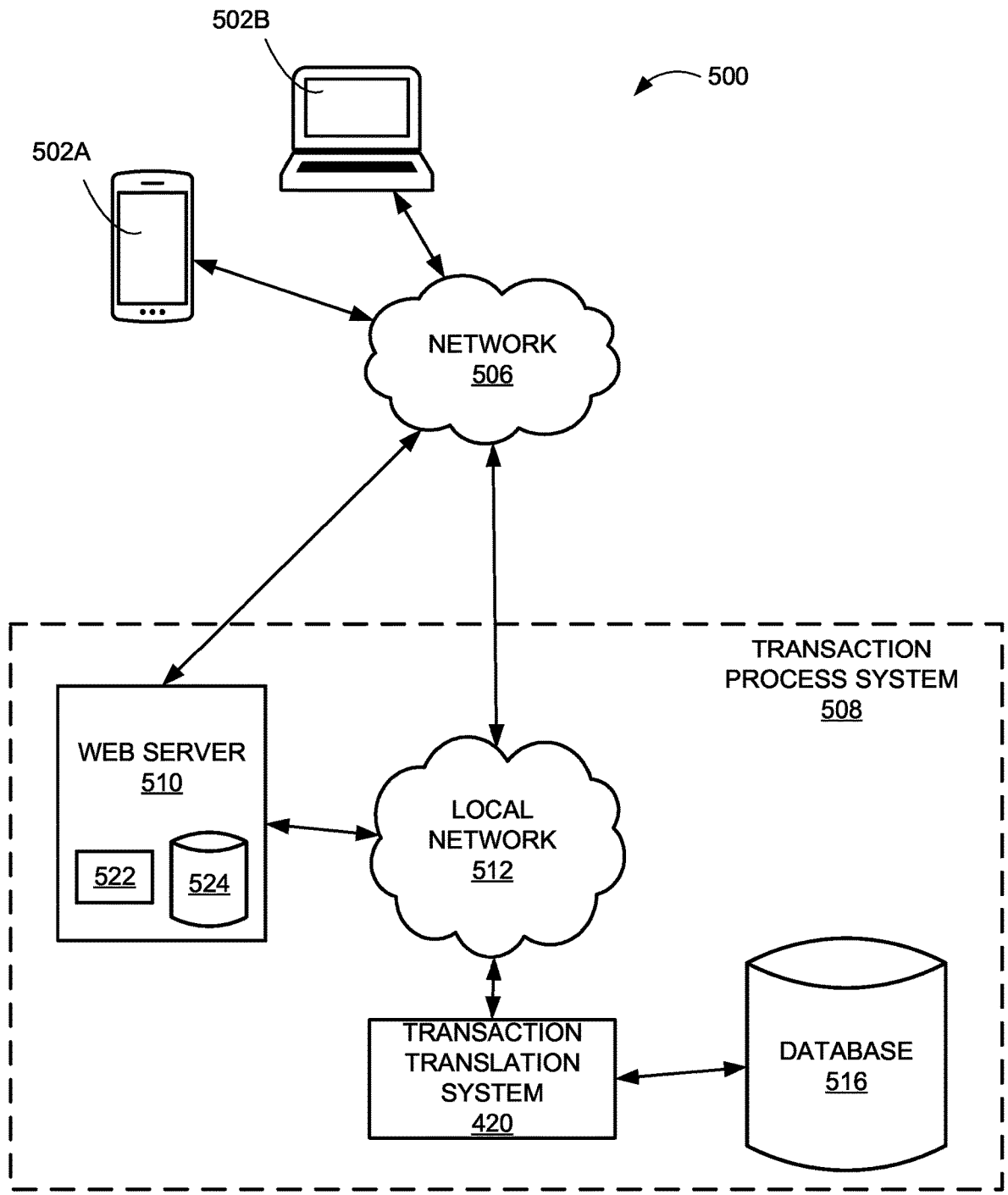
FIG. 5 is a block diagram of an example system 500 that may be used to translate enhanced transaction description data from an originating language to a target language, according to an example implementation of the disclosed technology.

FIG. 4 is a block diagram of the example transaction translation system 420, as also depicted in FIG. 5. According to some embodiments, the user device 502 and the web server 510 as depicted in FIG. 5 and described below, may have a similar structure and components that are similar to those described with respect to transaction translation system 420 shown in FIG. 4. As shown, the transaction translation system 420 may include a processor 410, an input/output ("I/O") device 420, a memory 430 containing an operating system ("OS") 440 and a program 450. In certain example implementations, the transaction translation system 420 may be a single server or may be configured as a distributed computer system including multiple servers or computers that interoperate to perform one or more of the processes and functionalities associated with the disclosed embodiments. In some embodiments, the transaction translation system 420 may further include a peripheral interface, a transceiver, a mobile network interface in communication with the processor 410, a bus configured to facilitate communication between the various components of the transaction translation system 420, and a power source configured to power one or more components of the transaction translation system 420

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 410 to communicate with other devices via wired or wireless networks, whether local or wide area, private or public, as known in the art. A power source may be configured to provide an appropriate alternating current (AC) or direct current (DC) to power components.

The processor 410 may include one or more of a microprocessor, microcontroller, digital signal processor, co-processor or the like or combinations thereof capable of executing stored instructions and operating upon stored data. The memory 430 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 430.

The processor 410 may be one or more known processing devices, such as, but not limited to, a microprocessor from the Pentium™ family manufactured by Intel™ or the Turion™ family manufactured by AMD™. The processor 310 may constitute a single core or multiple core processor that executes parallel processes simultaneously. For example, the processor 410 may be a single core processor that is configured with virtual processing technologies. In certain embodiments, the processor 310 may use logical processors to simultaneously execute and control multiple processes. The processor 410 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the transaction translation system 420 may include one or more storage devices configured to store information used by the processor 410 (or other components) to perform certain functions related to the disclosed embodiments. In one example, the transaction translation system 420 may include the memory 430 that includes instructions to enable the processor 410 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, the transaction translation system 420 may include a memory 430 that includes instructions that, when executed by the processor 410, perform one or more processes consistent with the functionalities disclosed herein. Methods, systems, and articles of manufacture consistent with disclosed embodiments are not limited to separate programs or computers configured to perform dedicated tasks. For example, the transaction translation system 420 may include the memory 430 that may include one or more programs 450 to perform one or more functions of the disclosed embodiments. For example, in some embodiments, the transaction translation system 420 may additionally manage dialogue and/or other interactions with the customer via a program 450.

The processor 410 may execute one or more programs 450 located remotely from the system 500 (such as the system shown in FIG. 5). For example, the system 500 may access one or more remote programs 450, that, when executed, perform functions related to disclosed embodiments.

The memory 430 may include one or more memory devices that store data and instructions used to perform one or more features of the disclosed embodiments. The memory 430 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 430 may include software components that, when executed by the processor 410, perform one or more processes consistent with the disclosed embodiments. In some embodiments, the memory 430 may include a translation database 460 for storing related data to enable the transaction translation system 420 to perform one or more of the processes and functionalities associated with the disclosed embodiments.

The translation database 460 may include stored data relating to a customer profile, customer accounts, user requests for translation, and default target language for users. According to some embodiments, the functions provided by the translation database 460 may also be provided by a database that is external to the transaction translation system 420, such as the database 516 as shown in FIG. 5.

The transaction translation system 420 may also be communicatively connected to one or more memory devices (e.g., databases) locally or through a network. The remote memory devices may be configured to store information and may be accessed and/or managed by the transaction translation system 420. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The transaction translation system 420 may also include one or more I/O devices 420 that may comprise one or more interfaces for receiving signals or input from devices and providing signals or output to one or more devices that allow data to be received and/or transmitted by the transaction translation system 420. For example, the transaction translation system 420 may include interface components, which may provide interfaces to one or more input devices, such as one or more keyboards, mouse devices, touch screens, track pads, trackballs, scroll wheels, digital cameras, microphones, sensors, and the like, that enable the transaction translation system 420 to receive data from one or more users (such as, for example, via the user devices 502A and 502B).

In example embodiments of the disclosed technology, the transaction translation system 420 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the transaction translation system 420 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the transaction translation system 420 may include a greater or lesser number of components than those illustrated.

FIG. 5 is a block diagram of an example system 500 that may be used to resolve a user's questions or problems encountered online. The system 500 may be configured to perform one or more processes that can adaptively generate responses based on an evolving context associated with customer interactions, orders, goods, services, etc. The components and arrangements shown in FIG. 5 are not intended to limit the disclosed embodiments as the components used to implement the disclosed processes and features may vary. As shown, system 500 may interact with a user devices 502A and 502B via a network 506. In certain example implementations, the system 500 may include a web server 510 and a local network 512, transaction translation system 420, and a database 516.

In some embodiments, a customer may operate the user devices 502A and 502B. The user devices 502A and 502B can include one or more of a mobile device, smart phone, general purpose computer, tablet computer, laptop computer, telephone, PSTN landline, smart wearable device, voice command device, other mobile computing device, or any other device capable of communicating with the network 506 and ultimately communicating with one or more components of the system 500. In some embodiments, the user devices 502A and 502B may include or incorporate electronic communication devices for hearing or vision impaired users.

Customers may include individuals such as, for example, subscribers, clients, prospective clients, or customers of an entity associated with an organization, such as individuals who have obtained, will obtain, or may obtain a product, service, or consultation from an entity associated with the system 500. According to some embodiments, the user devices 502A and 502B may include an environmental sensor for obtaining audio or visual data, such as a microphone and/or digital camera, a geographic location sensor for determining the location of the device, an input/output device such as a transceiver for sending and receiving data, a display for displaying digital images, one or more processors including a sentiment depiction processor, and a memory in communication with the one or more processors.

The network 506 may be of any suitable type, including individual connections via the internet such as cellular or WiFi networks. In some embodiments, the network 506 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 506 may include any type of computer networking arrangement used to exchange data. For example, the network 506 may be the Internet, a private data network, virtual private network using a public network, and/or other suitable connection(s) that enable(s) components in the system 500 environment to send and receive information between the components of the system 500. The network 506 may also include a public switched telephone network ("PSTN") and/or a wireless network.

In accordance with certain example implementations, a third-party server may be in communication with the system 500 via the network 506. In certain implementations, the third-party server can include a computer system associated with an entity (other than the entity associated with the system 500 and its customers) that performs one or more functions associated with the customers.

The system 500 may be associated with and optionally controlled by an entity such as a business, corporation, individual, partnership, or any other entity that provides one or more of goods, services, and consultations to individuals such as customers. The system 500 may include one or more servers and computer systems for performing one or more functions associated with products and/or services that the organization provides. Such servers and computer systems may include, for example, the web server 510 as well as any other computer systems necessary to accomplish tasks associated with the organization or the needs of customers (which may be customers of the entity associated with the organization). The web server 510 may include a computer system configured to generate and provide one or more websites accessible to customers, as well as any other individuals involved in an organization's normal operations. The web server 510, for example, may include a computer system configured to receive communications from the user devices 502A and 502B via for example, a mobile application, a chat program, an instant messaging program, a voice-to-text program, an SMS message, email, or any other type or format of written or electronic communication. The web server 510 may have one or more processors 522 and one or more web server databases 524, which may be any suitable repository of website data. Information stored in the web server 510 may be accessed (e.g., retrieved, updated, and added to) via the local network 512 (and/or the network 506) by one or more devices (e.g., the transaction translation system 420) of the system 500.

The local network 512 may include any type of computer networking arrangement used to exchange data in a localized area, such as WiFi, Bluetooth™ Ethernet, and other suitable network connections that enable components of the system 500 to interact with one another and to connect to the network 506 for interacting with components in the system 500 environment. In some embodiments, the local network 512 may include an interface for communicating with or linking to the network 506. In other embodiments, certain components of the system 500 may communicate via the network 506, without a separate local network 516.

In accordance with certain example implementations of the disclosed technology, the transaction translation system 420, which is described more fully below with reference to FIG. 5, may include one or more computer systems configured to compile data from a plurality of sources, such as the web server 510 and/or the database 516. The transaction translation system 420 may correlate compiled data, analyze the compiled data, arrange the compiled data, generate derived data based on the compiled data, and store the compiled and derived data in a database such as the database 516. According to some embodiments, the database 516 may be a database associated with an organization and/or a related entity that stores a variety of information relating to customers, transactions, and business operations. The database 516 may also serve as a back-up storage device and may contain data and information that is also stored on, for example, databases 524 and 460, as discussed with reference to FIG. 3.

Exemplary Use Cases

A system may receive raw transaction description data in an originating language (e.g., English) and associated with a user from a payment processing feed such as TSYS. The same system may receive a location (e.g., billing location) associated with the user. From the raw transaction description data, the system may identify one or more merchant names (e.g., Apple®) associated with one or more transactions. Based on the one or more merchant names, the system may retrieve additional merchant data (e.g., a specific merchant location (e.g., address) where a purchase was made, corporate address, phone number, email, website, brief description about the merchant, a rating of the merchant (e.g., a rating from the Better Business Bureau), or combinations thereof) associated with the one or more merchants in the originating language. The system generates enhanced transaction description data in the originating language by combining the raw transaction description data and the additional merchant data. Based on the location associated with the user, the system identifies a target language. For example, if the user has a billing location near the U.S.-Mexico border (e.g., San Diego, California) then the system may identify Spanish as a target language. Based on this identification, the system may select a first trained neural network (e.g., a recurrent neural network) from a number of trained neural network where the first trained neural network is trained to translate enhanced transaction description data from the originating language (e.g., English) to the target language (e.g., Spanish). Once selected, the system provides the enhanced transaction description data in the originating language to the first trained neural network. The system then translates the enhanced transaction description from the originating language to the target language using the first trained neural network. Finally, the system generates a GUI for display to the user that comprises the enhanced transaction description data in the target language.

Using the above-described system, the user can view a list of transactions for her account (e.g., credit card or debit card) online or via an application (e.g., a mobile application) using a user device in a target language or in both the target language and the originating language. The user can then submit feedback by clicking whether the transaction is accurate or has errors. The user may even be able to submit a corrected transaction for a given transaction.

Sometimes the system identifies the originating language associated with transaction description data for a given one or more transactions. While the system may identify the originating language by associating the specific location where a purchase was made from the additional merchant data. For example, if a transaction was made with a merchant located in the United States, the transaction process system 508 (e.g., transaction translation system 420) may identify the originating language as English. However, if a transaction was made with a merchant located in China, the transaction process system 508 (e.g., transaction translation system 420) may identify the originating language as China's official language, Mandarin. Alternatively, the originating language is detected based on the text of the raw transaction description data using natural language processing techniques (e.g., using n-grams, an RNN).

Sometimes, the system may be further configured to prompt the user to select their language of choice. For example, the user may select which language they would like their transactions to be translated to rather than relying on their physical billing location to determine a target language.

Disclosed embodiments may include a system that includes one or more processors and a memory in communication with the one or more processors and storing instructions are configured to cause the communication system to perform a method. The method may include receiving description data in an originating language for a user and a location associated with the user, identifying one or more names from the description data, retrieving additional data in the originating language based on the one or more names, generating enhanced description data in the originating language for the user based on the description data and the additional data, identifying a target language based on the location associated with the user, selecting a first trained neural network from a plurality of trained neural networks based the target language, providing the enhanced description data in the originating language to the first trained neural network, translating, via the first trained neural network, the enhanced description data from the originating language to the target language, and generating a graphical user interface (GUI) for display that comprises the enhanced description data in the target language.

In some embodiments, the first trained neural network includes a recurrent neural network.

In some embodiments, the recurrent neural network includes an encoder and a decoder.

In some embodiments, identifying the target language includes retrieving the location associated with the user and matching the location with a first location from a predetermined list of locations associated with the target language.

In some embodiments, the GUI further includes the enhanced description data in the originating language.

In some embodiments, the additional data includes an address, a phone number, an email, and a uniform resource locator.

In some embodiments, the instructions are further configured to cause the system to transmit the GUI to a user device associated with the user for display.

In some embodiments, the instructions are further configured to cause the system to receive feedback instructions related to an accuracy of the enhanced description data in the target language from the user device.

In some embodiments, the instructions are further configured to cause the system to train the first trained neural network based on the feedback instructions.

Disclosed embodiments may include a system that includes one or more processors and a memory in communication with the one or more processors and storing instructions are configured to cause the communication system to perform a method. The method may include receiving description data in an originating language for a user, additional data in the originating language, and a location of the user, generating enhanced description data in the originating language for the user based on the description data and the additional data, identifying a target language based on the location associated with the user, selecting a first trained neural network from a plurality of trained neural networks based the target language, providing the enhanced description data in the originating language to the first trained neural network, translating, via the first trained neural network, the enhanced description data from the originating language to the target language, and generating a graphical user interface (GUI) for display that comprises the enhanced description data in the target language In some embodiments, the first trained neural network includes a recurrent neural network.

In some embodiments, the recurrent neural network includes an encoder and a decoder.

In some embodiments, identifying the target language includes retrieving the location associated with the user and matching the location with a first location from a predetermined list of locations associated with the target language.

In some embodiments, the GUI further includes the enhanced description data in the originating language.

In some embodiments, the additional data includes an address, a phone number, an email, and a uniform resource locator.

In some embodiments, the instructions are further configured to cause the system to transmit the GUI to a user device associated with the user for display.

Disclosed embodiments may include a system that includes one or more processors and a memory in communication with the one or more processors and storing instructions are configured to cause the communication system to perform a method. The method may include receiving description data in an originating language for a user and a location associated with the user, identifying one or more names from the description data, retrieving additional data in the originating language based on the one or more names, generating enhanced description data in the originating language for the user based on the description data and the additional data, providing the enhanced description data in the originating language to a first trained neural network, translating, via the first trained neural network, the enhanced description data from the originating language to the target language, and generating a graphical user interface (GUI) for display that comprises the enhanced description data in the target language.

In some embodiments, the instructions are further configured to cause the system to transmit the GUI to a user device associated with the user for display.

In some embodiments, the instructions are further configured to cause the system to receive feedback instructions related to an accuracy of the enhanced description data in the target language from the user device.

In some embodiments, the instructions are further configured to cause the system to train the first trained neural network based on the feedback instructions.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system, comprising:
one or more processors; and
a memory in communication with the one or more processors and storing instructions are configured to cause the system to:
receive or retrieve (i) transaction description data in an originating language, the transaction description data associated with one or more transactions made by a user, and (ii) a location associated with the user from a payment processing server;
for each transaction of the one or more transactions made by the user in the originating language during a predetermined period of time:
identify one or more names from the transaction description data;
retrieve additional data in the originating language based on the one or more names;
generate enhanced description data in the originating language for the user based on the transaction description data and the additional data;
identify a target language based on the location associated with the user;
select a first trained neural network from a plurality of trained neural networks based on the target language;
provide the enhanced description data in the originating language to the first trained neural network; and
translate, via the first trained neural network, the enhanced description data from the originating language to the target language;
generate a first graphical user interface (GUI) comprising:
the enhanced description data for each transaction of the one or more transactions in the target language during the predetermined period of time; and
a selectable option associated with each transaction of the one or more transactions;
receive an indication, via the first GUI, that the user selected the selectable option associated with a first transaction of the one or more transactions; and
responsive to receiving the indication, cause the first GUI to additionally display the enhanced description data associated with the first transaction in the originating language.

2. The system of claim 1, wherein the first trained neural network comprises a recurrent neural network.

3. The system of claim 2, wherein the recurrent neural network comprises an encoder and a decoder.

4. The system of claim 1, wherein identifying the target language comprises retrieving the location associated with the user and matching the location with a first location from a predetermined list of locations associated with the target language.

5. The system of claim 1, wherein:
the enhanced description data further comprises a map, and
the selectable option comprises a button.

6. The system of claim 1, wherein the additional data comprises an address, a phone number, an email, and a uniform resource locator.

7. The system of claim 1, wherein the instructions are further configured to cause the system to transmit the first GUI to a user device associated with the user for display.

8. The system of claim 7, wherein the instructions are further configured to cause the system to:
receive feedback instructions related to an accuracy of the enhanced description data in the target language from the user device; and
train the first trained neural network based on the feedback instructions.

9. The system of claim 1, wherein:
the transaction made by the user is associated with a purchase made using a debit card or a credit card,
the additional data includes a merchant location based on the one or more names, and
the instructions are further configured to cause the system to:
identify the originating language based on the merchant location.

10. A system, comprising:
one or more processors; and
a memory in communication with the one or more processors and storing instructions are configured to cause the system to:
receive or retrieve (i) raw transaction description data in one or more originating languages, the raw transaction description data associated with one or more transactions made by a user from a payment processing server within a predetermined period of time, (ii) additional data in the originating language, and (iii) a location of the user;
for each transaction of the one or more transactions made by the user in each originating language of the one or more originating languages during a predetermined period of time:
generate enhanced description data in the originating language for the user based on the raw transaction description data and the additional data;
identify a target language based on the location associated with the user;
select a trained neural network from a plurality of trained neural networks based on the target language and the originating language;
provide the enhanced description data in the originating language to the respective trained neural network;
translate, via the respective trained neural network, the enhanced description data from the originating language to the target language; and
generate a first graphical user interface (GUI) comprising:
the enhanced description data for each transaction of the one or more transactions in the target language during the predetermined period; and
a selectable option associated with each transaction of the one or more transactions;
receive an indication, via the first GUI, that the user selected the selectable option associated with a first transaction of the one or more transactions; and
responsive to receiving the indication, cause the first GUI to additionally display the enhanced description data associated with the first transaction in the originating language.

11. The system of claim 10, wherein each trained neural network comprises a recurrent neural network with an encoder and a decoder.

12. The system of claim 10, wherein the location of the user is a billing location.

13. The system of claim 11, wherein identifying the target language comprises retrieving the location associated with the user and matching the location with a first location of a predetermined list of locations associated with the target language.

14. The system of claim 10, wherein the first GUI further comprises a flag associated with each transaction of the one or more transactions with the enhanced description data translated to the target language during the predetermined period, the flag indicating the enhanced description data was translated and showing the originating language and the target language.

15. The system of claim 10, wherein:
the additional data comprises an address, a phone number, an email, and a uniform resource locator, and
the instructions are further configured to cause the system to transmit the first GUI to a user device associated with the user for display.

16. The system of claim 10, wherein the instructions are further configured to cause the system to identify the originating language based on the raw transaction description data using natural language processing.

17. A system, comprising:
one or more processors; and
a memory in communication with the one or more processors and storing instructions are configured to cause the system to:
receive or retrieve transaction description data in one or more originating languages, the transaction description data associated with one or more transactions made by a user during a predetermined period of time;
identify the originating language of the one or more originating languages associated with each transaction of the one or more transactions using a first neural network;
identify one or more names from the transaction description data;
retrieve additional data in the originating language based on the one or more names;
generate enhanced description data in the originating language for the user based on the transaction description data and the additional data for each of the one or more transactions during the predetermined period;
determine whether the enhanced description data for each transaction of the one or more transactions requires translation from the originating language to the target language;
responsive to determining the enhanced description data requires translation from the originating language to the target language:
provide the enhanced description data in the originating language for each of the one or more transactions to a selected trained neural network of a plurality of trained neural networks; and
translate, via the selected trained neural network, the enhanced description data from the originating language to a target language;
generate a first graphical user interface (GUI) comprising the enhanced description data for each transaction of the one or more transactions during the predetermined period, wherein:
for each transaction of the one or more transactions associated with enhanced description data requiring translation from the originating language to the target language, the first GUI displays;
the enhanced description data in the target language with a flag indicating the enhanced description data was translated;
a selectable option, and
for each transaction of the one or more transactions associated with enhanced description data not requiring translation from the originating language to the target language, the first GUI displays the enhanced description data in the originating language;
receive an indication, via the first GUI, that the user selected the selectable option associated with a first transaction of the one or more transactions;
responsive to receiving the indication:
cause the first GUI to additionally display the enhanced description data associated with the first transaction in the originating language; and
receive, via the first GUI, feedback instructions related to an accuracy of the enhanced description data in the target language.

18. The system of claim 17, wherein the instructions are further configured to cause the system to transmit the first GUI to a user device associated with the user for display.

19. The system of claim 17, wherein the instructions are further configured to cause the system to train the selected trained neural network based on the feedback instructions.

* * * * *